United States Patent [19]

Dawawala et al.

[11] Patent Number: 4,679,769
[45] Date of Patent: Jul. 14, 1987

[54] STEAM TURBINE CONTROL VALVE FOR CYCLIC DUTY

[75] Inventors: Suryakant K. Dawawala, Casselberry, Fla.; Bernard L. LaCoste, Wilmington, Del.

[73] Assignee: Westinghouse Electric Corp., Pittsburgh, Pa.

[21] Appl. No.: 936,926

[22] Filed: Nov. 28, 1986

Related U.S. Application Data

[63] Continuation of Ser. No. 770,379, Aug. 29, 1985, abandoned, which is a continuation of Ser. No. 635,376, Jul. 27, 1984, abandoned.

[51] Int. Cl.⁴ ............................................. F16K 1/32
[52] U.S. Cl. .................................. 251/282; 137/312; 137/630.13; 251/319

[58] Field of Search ............. 137/630.13, 630.14, 137/630.15; 251/214, 319; 251/282

[56] References Cited

U.S. PATENT DOCUMENTS

3,987,818 10/1976 Williams ................... 137/630.13
4,240,609 12/1980 Hahn ............................ 251/282

FOREIGN PATENT DOCUMENTS

108104 8/1979 Japan ........................ 137/630.13

Primary Examiner—Robert G. Nilson
Attorney, Agent, or Firm—F. J. Baehr, Jr.

[57] ABSTRACT

A control valve for cyclic duty steam turbines having a one piece bonnet configuration which has been designed to minimize the affects of and withstand expected cyclic stresses during hot, warm and cold startup conditions of turbines utilized for peak loading.

6 Claims, 2 Drawing Figures

STEAM TURBINE CONTROL VALVE FOR CYCLIC DUTY

This application is a continuation of application Ser. No. 06/770,379 filed Aug. 29, 1985, now abandoned, which application is a continuation of applicationl Ser. No. 06/635,376, filed July 27, 1984, now abandoned.

BACKGROUND OF THE INVENTION

This invention relates to valves and more particularly to a control valve for a steam turbine which is subjected to cyclic duty.

When steam turbines are base loaded they are run for extended periods of time with only minor transient temperature changes. However, when utilized for peak loads the machines are subject to hot starts after overnight shutdowns, warm starts after weekend shutdowns and cold starts after extended shutdown resulting in large temperature changes at the control valve which controls the amount of steam that flows to the turbine. These transient high temperatures result in cyclic stresses and the internals of the control valve must be modified if the valve is to have a long operating life.

SUMMARY OF THE INVENTION

In general, a turbine control valve, when made in accordance with this invention, comprises a body having a cavity disposed therein. The cavity has an elongated generally round first opening on one side thereof, a generally round second opening with a valve seat disposed therein on the side opposite the first opening and a third opening for admitting steam to the cavity. The control valve also comprises a valve plug, which mates with the valve seat to close off the second opening and a bonnet having a generally cylindrical portion with an integral flange on one end of the cylindrical portion. The flange has a circumferential sealing surface which mates with a circumferential sealing surface adjacent the first opening. The bonnet has a centrally disposed bore extending therethrough with two counter bores extending inwardly from the end without the flange. The first counter bore is long and terminates with a large radius while the second counter bore is sufficiently deep to receive the plug and also terminates with a radius. The cylindrical portion of the bonnet has a first raised land on the outer surface adjacent the flange and a second raised land on the outer surface and spaced from the first land. The first raised land is larger in diameter than the second raised land. The first opening in the body also has raised first and second lands which respectively mate with the first and second lands on the cylindrical portion of the bonnet with low clearances between the mating lands. The control valve also comprises a hardened sleeve tightly fit into the first counter bore in the bonnet, a stem guide bushing fastened in the bore of the bonnet, a valve stem slidably disposed in the stem guide bushing and a plug guide slidably disposed in the hardened sleeve and fastened to the valve stem and to the valve plug so that the sliding motion between the sleeve stem and the plug guide is small. The valve plug has a centrally disposed port extending therethrough and the valve stem closes the port when closing force is exerted on the valve plug through the valve stem and opens the port when opening force is exerted on the valve plug through the valve stem to provide a control valve operable in cyclic duty wherein large temperature changes occur at the plug.

BRIEF DESCRIPTION OF THE DRAWINGS

The objects and advantages of this invention will become more apparent from reading the following detailed description in conjunction with the accompanying drawings, in which.

BRIEF DESCRIPTION OF THE PREFERRED EMBODIMENT

Figure 1:
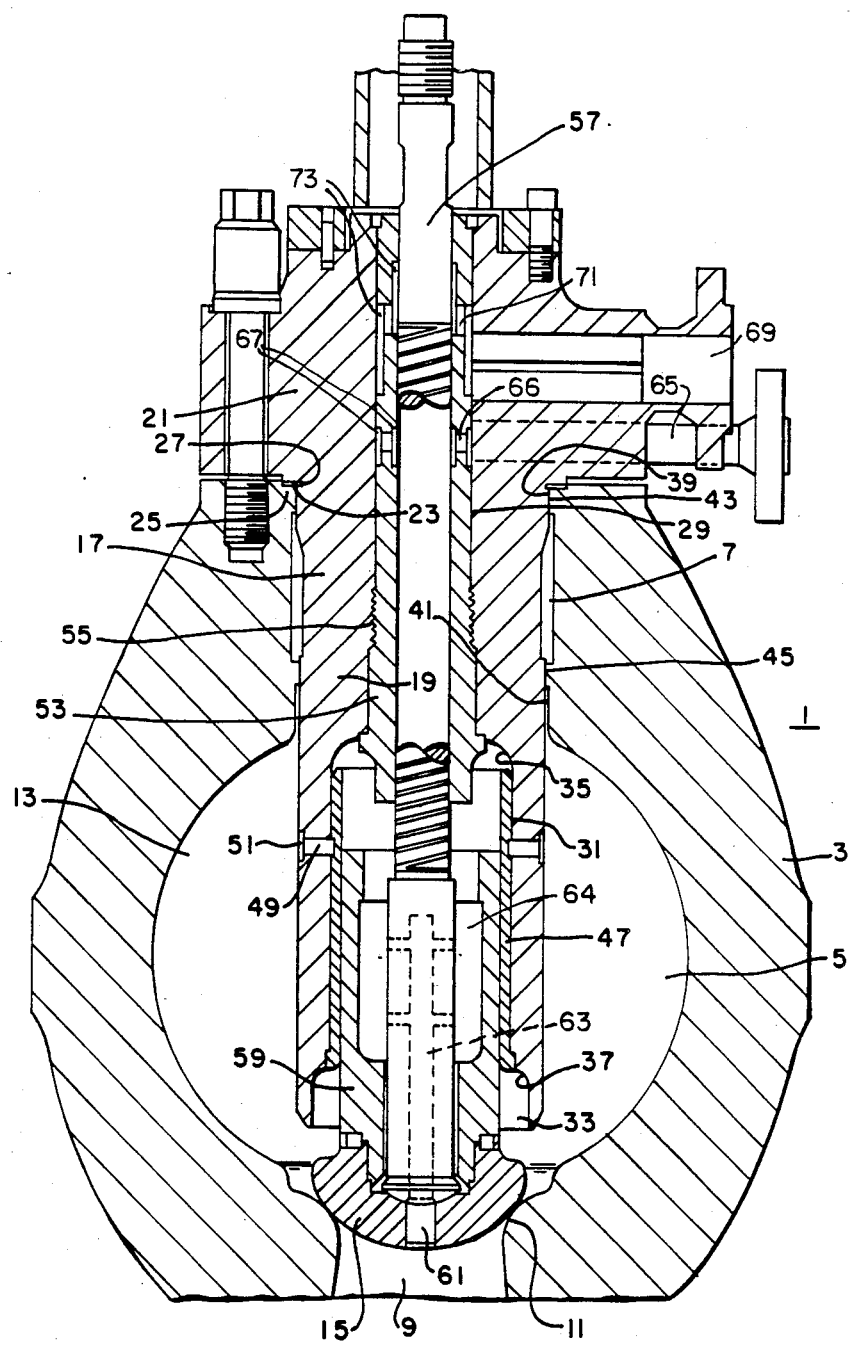
FIG. 1 is a partial sectional view of a steam turbine control valve made for peak loading operations.
Figure 2:
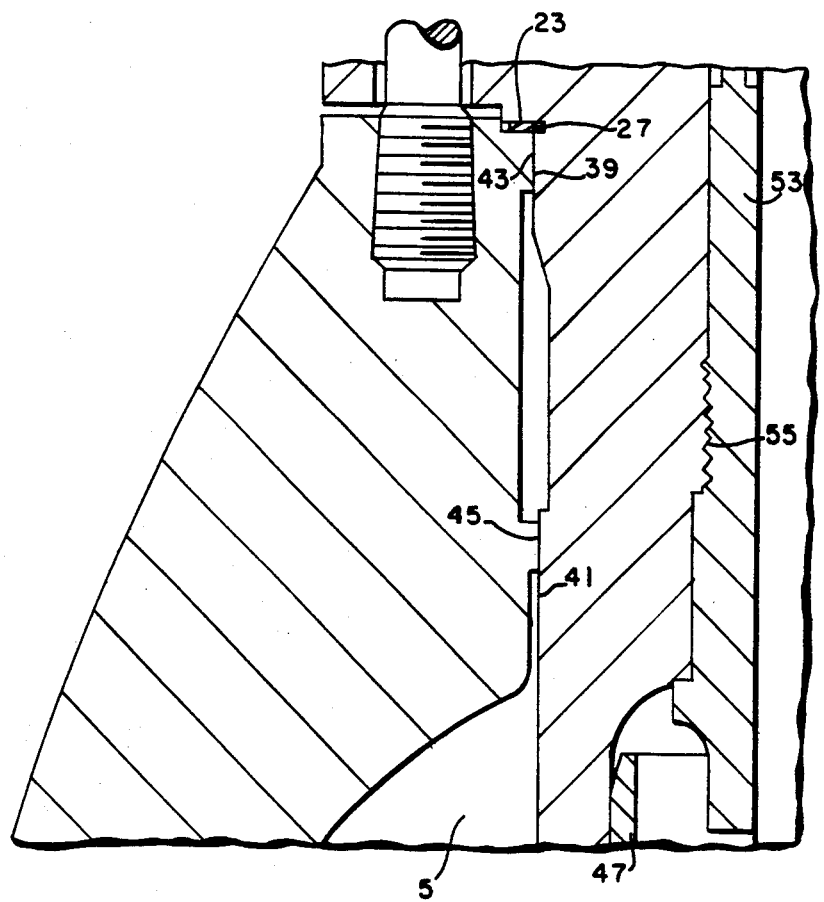
FIG. 2 is an enlarged sectional view of a portion of the bonnet and valve stem guide of the valve.

Referring now to the drawings in detail and in particular to FIG. 1 there is shown a control valve 1 for a steam turbine (not shown) which is used for peaking loads. The control valve 1 comprises a body 3 having a large cavity 5 disposed therein. The cavity 5 has an elongated generally round first opening 7 on one side of the cavity, the top side as shown in FIG. 1, a generally round second opening 9 with a valve seat 11 disposed therein on a side opposite the first opening 7, and a third opening 13 for admitting steam coincident with the central portion of the cavity 5.

A valve plug 15 is disposed in the cavity 5 to mate with the valve seat 11 to control the flow of steam between the valve seat and plug 11 and 15, respectively.

A bonnet 17 is disposed in the first opening 7 and the bonnet 17 comprises a generally cylindrical portion 19 and an integral flange 21 disposed on one end of the cylindrical portion 19. The flange 21 has a circumferential sealing surface 23, which mates with a circumferential sealing surface 25 disposed on the body encircling the first opening 7. A gasket 27 is disposed between the sealing surfaces 23 and 25 to form a pressure tight seal. The bonnet 17 also has a centrally disposed bore 29 extending therethrough with two counter bores 31 and 33 extending inwardly from the end of the bonnet 17 without the flange 21. The first counter bore 31 is deeper or longer than the second counter bore 33 and terminates with a large fillet radius 35. The second counter bore 33 is sufficiently deep to receive the valve plug 15 and also terminates with a fillet radius 37.

The cylindrical portion 19 of the bonnet 17 has a first raised land 39 on the outer surface adjacent the flange 21 and a second raised land 41 on the outer surface and spaced from the first land 39. The first land 39 is larger in diameter than the second land 41. The first opening 7 in the body has first and second lands 43 and 45, respectively, which mate respectively with the first and second lands 39 and 41 of the cylindrical portion 19. There is a small or low clearance generally between 0.002 to 0.006 of an inch between the mating lands.

A case hardened sleeve or liner 47 made of a nitroalloy is tightly fit into the first counter bore 31 utilizing a shrink fit. Hardened pins 49 extend through the walls of the bonnets 17 and into, but not through, the sleeve 47 to prevent rotation of the sleeve 47 with respect to the bonnet 17. The pins 49 are held in place by disks 51 which are tack welded to the bonnet 17.

A stem guide bushing 53 is fastened in the bore of the bonnet by engaging threads 55 and a hex end is provided on the stem guide bushing to accept a wrench.

A valve stem 57 is slidably disposed in the guide bushing 53 and a plug guide 59 is slidably disposed in the hardened sleeve 47 and affixed to the valve stem 57 and to the valve plug 15 in such a manner that the sliding motion between the valve stem 57 and the plug guide 59 is small. The valve plug 15 has a centrally disposed port 61 extending therethrough. The valve stem 57 and the port 61 cooperate to provide means for equalizing the pressure behind the plug 15 with the pressure downstream of the plug 15 and seat 11 to reduce the opening force being applied to the valve stem 57 to lift the plug 15 via the passage 63 in the valve stem 57 as shown in FIG. 1 or by raising an imperforate valve stem (not shown) to uncover the port 61 prior to lifting the plug 15 from the seat 11.

A first leak off conduit 65 is disposed in fluid communication with port 66 and circumferential grooves 67 in the guide bushing 53 and a second leak off conduit 69 is disposed in fluid communication with port 71 and circumferential groove 73 at the upper end of the guide bushing 53.

A high pressure leak off conduit 65 is in fluid communication with ports 66 and circumferential grooves 67 in the guide bushing 53. A low pressure leak off conduit 69 is in fluid communication with ports 71 and circumferential grooves 73 at the upper end of the guide bushing 53.

The control valve hereinbefore described advantageously has improved cyclic duty capability due to the large fillet radius in the bonnet walls inner surface so that stress peaks occurring in the bonnet wall during cyclic operations are minimized, the thread region of the stem guide and bonnet are disposed away from the large fillet radius in a relatively low thermal stress region and the tight clearance between the lands maintains rigidity of the bonnet while allowing steam to penetrate the clearance along the outside of the bonnet to the gasket to provide more uniform heating of the bonnet and the difference in diameter of the lands facilitates disassembly of the valve bonnet even from rusted valve bodies after operating in a steam environment.

What is claimed is:

1. A turbine control valve comprising:
    a body having a cavity disposed therein, the cavity having an elongated generally round first opening on one side of the cavity, the first opening having a circumferential sealing surface adjacent thereto, a generally round second opening with a valve seat disposed therein on a side opposite the first opening, and a third opening for admitting steam to the cavity;
    a valve plug which mates with the valve seat to close off the second opening;
    a bonnet having a generally cylindrical portion with an integral flange on one end of the cylindrical portion, the flange having a circumferential seal surface which mates with the circumferential sealing surface adjacent the first opening, the bonnet having a centrally disposed bore extending therethrough with two counter bores extending inwardly from the end without the flange, the first counter bore being long and terminating with a large fillet radius, the second counter bore being sufficiently deep to receive the plug and also terminating with a fillet radius, the cylindrical portion having a first raised land on the outer surface adjacent the flange and a second raised land on the outer surface and spaced from the first land and the first raised land being larger in diameter than the second raised land;
    the first opening in the body also having raised first and second lands which respectively mate with the first and second lands on the cylindrical portion of the bonnet in such a manner that there is a low clearance between the mating lands;
    a hardened sleeve tightly fit into the first counter bore in the bonnet;
    a stem guide bushing fastened in the bore of the bonnet;
    a valve stem slidably disposed in the stem guide bushing;
    a plug guide slidably disposed in the hardened sleeve and on the valve stem and affixed to the valve plug so that the sliding motion between the valve stem and the plug guide is small;
    the valve plug having a centrally disposed port extending therethrough which cooperates with the valve stem to provide means for reducing the force required to remove the plug from the seat to form a control valve operable for cyclic duty where large temperature changes occur at the plug.

2. A steam control valve as set forth in claim 1, wherein the stem guide is fastened to the bonnet by engaging threads which are located a sufficient distance from the terminal end of the first counter bore that the thermal stress in the threaded portions are relatively low.

3. A steam control valve as set forth in claim 1 and further comprising pins disposed between the bonnet and the stem guide to prevent unscrewing of the stem guide during operation of the valve.

4. A steam control valve as set forth in claim 1, wherein the hardened sleeve is fit into the first counter bore of the bonnet by a shrunk fit.

5. A steam control valve as set forth in claim 1 and further comprising hardened pins extending through the bonnet and into the hardened sleeve.

6. A steam control valve as set forth in claim 5 and further comprising disks tack welded to the bonnet to retain the hardened pins.

* * * * *